US007761912B2

(12) United States Patent
Yee et al.

(10) Patent No.: US 7,761,912 B2
(45) Date of Patent: Jul. 20, 2010

(54) REPUTATION DRIVEN FIREWALL

(75) Inventors: Steven C Yee, Renton, WA (US); Mauktik H Gandhi, Redmond, WA (US); Brian R. Hall, Seattle, WA (US); Vikram Kakumani, Redmond, WA (US); Michael Mitchell, Marysville, WA (US); Tatiana Shubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 11/422,498

(22) Filed: Jun. 6, 2006

(65) Prior Publication Data

US 2008/0022384 A1 Jan. 24, 2008

(51) Int. Cl.
*H04L 29/06* (2006.01)
(52) U.S. Cl. .......................................... 726/11; 726/22
(58) Field of Classification Search .................. 726/11, 726/2–3, 26; 707/9
See application file for complete search history.

(56) References Cited

U.S. PATENT DOCUMENTS

| 6,052,788 | A | * | 4/2000 | Wesinger et al. ............... 726/11 |
| 6,119,236 | A | | 9/2000 | Shipley |
| 6,519,703 | B1 | | 2/2003 | Joyce |
| 6,715,084 | B2 | | 3/2004 | Aaron et al. |
| 6,785,821 | B1 | | 8/2004 | Teal |
| 7,340,770 | B2 | * | 3/2008 | Freund ......................... 726/11 |
| 2004/0015719 | A1 | | 1/2004 | Lee et al. |
| 2005/0182968 | A1 | | 8/2005 | Izatt et al. |
| 2005/0229246 | A1 | | 10/2005 | Rajagopal et al. |
| 2006/0059550 | A1 | | 3/2006 | Kausik |
| 2006/0059551 | A1 | | 3/2006 | Borella |

OTHER PUBLICATIONS

"Kaspersky Anti-Hacker 1.8.180", http://www.softpedia.com/get/Security/Firewall/Kaspersky-AntiHacker.shtml, printed on Mar. 24, 2006, 5 pages.
"Sunbelt Kerio Personal Firewall", Sunbelt Software, Version: 4.2.3.912, http://www.sunbelt-software.com/Kerio.cfm, printed on Mar. 24, 2006, 7 pages.
Zou et al., "Architecture and Fuzzy Adaptive Security Algorithm in Itelligent Firewall", IEEE, 2002, pp. 1145-1149.

* cited by examiner

*Primary Examiner*—Gilberto Barron, Jr.
*Assistant Examiner*—Virginia Ho
(74) *Attorney, Agent, or Firm*—Lee & Hayes, PLLC

(57) ABSTRACT

Reputation based firewall policy techniques are described, in which, a computer-implemented method may be employed to collect data from a plurality of clients regarding an application attempting to access a network via the clients. The collected data may be exposed to a community of users to obtain feedback on the application which is used to produce a reputation for the application. The reputation may then be provided to the plurality of clients to determine whether to permit the attempt by the application.

10 Claims, 5 Drawing Sheets

REPUTATION DRIVEN FIREWALL

BACKGROUND

A variety of applications such as music players, browsers, productivity applications, anti-virus, program extensions, add-ins may make attempts to access a network (e.g., the internet) from a computing device. Some of these applications may be unknown or may be applications for which a user may prefer not to allow access. Further, malicious or programs such as spyware, viruses and so forth may also attempt network access. Thus, allowing uncontrolled access to a network via a computing device may permit network access to unknown, undesirable, and/or malicious programs which may harm a computer and or information that is important to users of the computers. Thus, firewalls may be used on computing device to manage the network access permitted via the computing device.

One a traditional firewall approach involves prompting a user to indicate for each application whether to permit or deny network access attempts. However, users may not have the sophistication or knowledge to make an informed determination as to which particular applications should be permitted or denied access. Accordingly, user may inadvertently or unintentionally permit access to malicious applications and/or block useful or benign applications. Further, user may consider the prompts annoying or frustrating when they are not comfortable with making the requested determination. Thus, this traditional firewall approach to determining which application are permitted network access may be frustrating to the users as well as ineffective at preventing access to unknown, undesirable, and/or malicious programs.

SUMMARY

Reputation driven firewall techniques are described in which reputations are generated for applications and are utilized by a firewall on clients to determine whether network access should be permitted to applications. In an implementation, a service collects data from a plurality of clients regarding an application seeking network access from the clients. The collected data is exposed by the service to a community of users who may examine the collected data and provide feedback to the service regarding whether to allow the application access to the network. The service then uses the community feedback to produce a reputation corresponding to the application which, when provided to the clients, may be used by a firewall to automatically determine based on the reputation whether network access should be permitted to application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
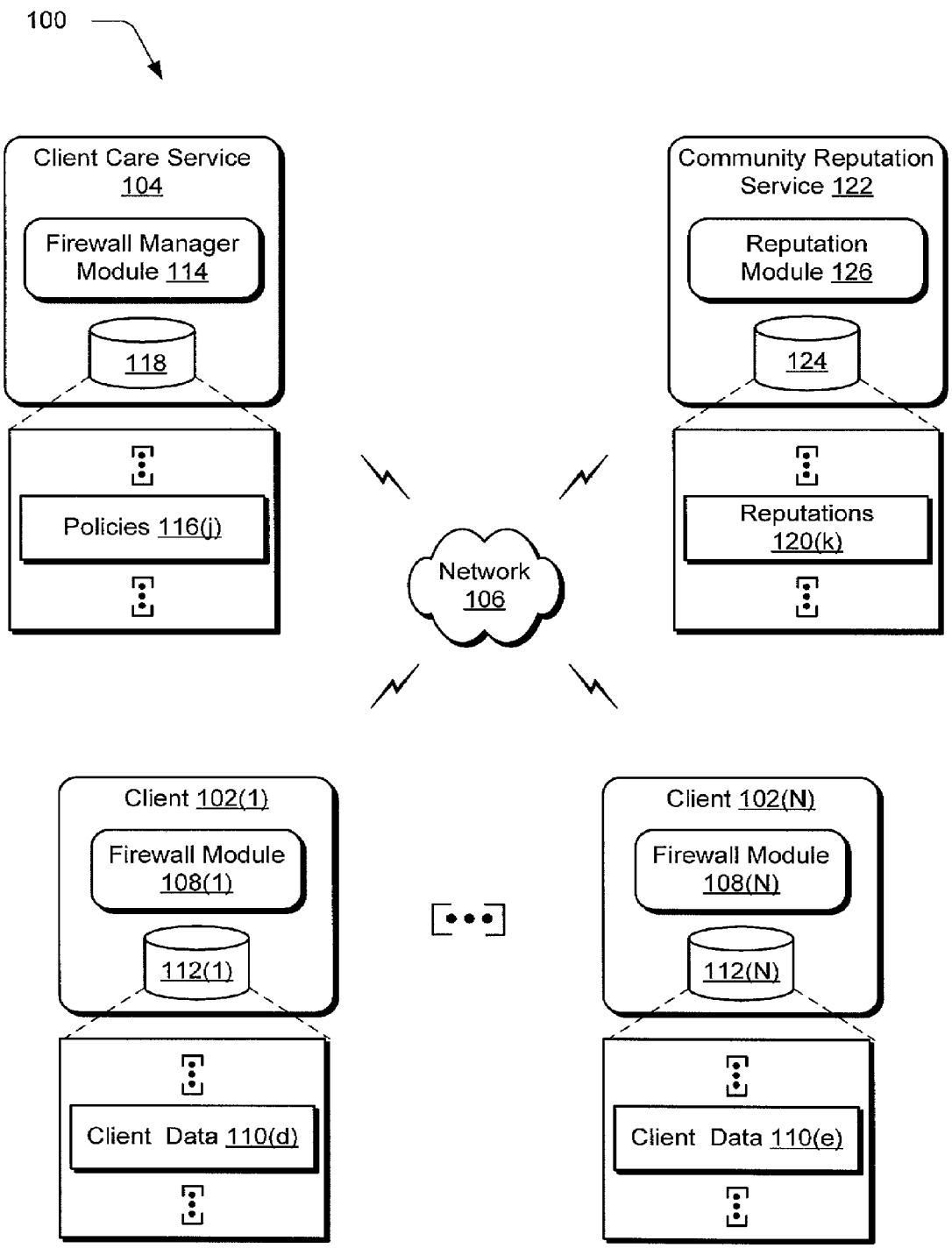
FIG. 1 is an illustration of an environment in an exemplary implementation that is operable to employ reputation driven firewall techniques.

A variety of applications may attempt to access a network (e.g., the internet) from a client which may include applications which may have both legitimate and malicious purposes, applications that a user desire to have access, and those for which a user may consider access undesirable. Thus, if access is left uncontrolled malicious and/or undesirable programs may be permitted to access the network.

Firewalls may be used to control which application are permitted to access a network from a client. In a traditional firewall technique, all attempts from unknown applications (e.g., those applications not recognized by the firewall) are blocked. However, this may result in desirable and/or benign programs which are not known (e.g. new applications) being blocked by the firewall as well. Another technique is for a firewall to prompt an individual user to decide for each application whether access should be permitted. However, individual users may not have the technical understanding to make a good decision for particular applications or may not be comfortable doing so.

Accordingly, reputation driven firewall techniques are described in which feedback from a community of users is collected and used to produce reputations for a plurality of applications which may be used by a firewall to automatically determine whether an application should be permitted or denied. For example, a plurality of clients may each execute a firewall module which monitors the client and collects data regarding applications attempting access to a network on the client. Each client, for example, may detect an application "addin.exe" that is attempting to access the network. The client may then collect data regarding the attempt, such as which ports are being used, communication protocols used, the process id, digital signature, files which are accessed, attempted registry access and so forth. Entire application files making the attempt, such as "add-in.exe, may also be collected for submission and further investigation. The collected data and/or application files from the plurality of clients for "add-in.exe" (along with data corresponding to many other applications) may then be communicated to a service which stores the data, such as in a relational database.

The database (e.g., collected data) including data for "add-in.exe" may be exposed to a community of users such that the users may examine data collected for a plurality of applications. The users may then provide feedback on the applications in the database, such as indicating if a firewall should block or allow the application, rating the applications, or recommendations such as uninstalling the applications, upgrading to a new version and so forth. For instance, a plurality of users may rate trustworthiness of "addin.exe". In an implementation, the rating indicates relative trustworthiness on a numerical scale (e.g., from 1 to 10) in which a higher number indicates greater trust. A variety of other feedback and ratings are also contemplated such as comments, an allow/block rating, and so forth.

The feedback data from one or more of the community of users may then be used to produce reputations for the plurality of applications. Thus, for "addin.exe", feedback may be a plurality of individual user ratings from 1 to 10 which may further be averaged to produce a reputation in the form of an overall rating, for instance, an overall rating of 7.3. The reputations, when provided to clients, may be utilized by the firewall to determine whether access to an application is permitted. Thus, a firewall may examine a reputation for "add-in.exe" and determine based on the corresponding rating of 7.3 whether to permit an attempt by "addin.exe" to access the network.

It is noted that the determination of whether to permit access may occur on the client in response to an attempt by an application such as "addin.exe" automatically and without user intervention. For instance, a firewall module does not prompt the user whether they would like to allow or block the application (e.g., "addin.exe"). Rather, the reputation corresponding to the application is accessed and applied to the attempted access with "no questions asked" of the user.

In the following discussion, an exemplary environment is first described that is operable to perform client category configuration techniques. Exemplary procedures are then described which may be employed in the environment, as well as in other environments.

Exemplary Environment

FIG. 1 is an illustration of an environment 100 in an exemplary implementation that is operable to employ reputation-driven firewall techniques. The illustrated environment 100 includes a plurality of clients 102(1), [ . . . ], 102(N) that are communicatively coupled to a client care service 104 over a network 106. While a single client care service 104 is depicted, it is contemplated that the functionality associated with client care service 104 may be implemented by a plurality of services, which may each provide the same functions or may divide different functions between themselves.

The clients 102(1)-102(N) may be configured in a variety of ways for accessing the network 106. For example, one or more of the clients 102(1)-102(N) may be configured as a computing device, such as a desktop computer, a mobile station, an entertainment appliance, a set-top box communicatively coupled to a display device, a wireless phone, a game console, and so forth. Thus, the clients 102(1)-102(N) may range from full resource devices with substantial memory and processor resources (e.g., personal computers, game consoles) to low-resource devices with limited memory and/or processing resources (e.g., traditional set-top boxes, hand-held game consoles). For purposes of the following discussion, the clients 102(1)-102(N) may also relate to a person and/or entity that operate the clients. In other words, one or more of the clients 102(1)-102(N) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The clients 102(1)-102(N) are each illustrated as having a respective firewall module 108(1)-108(N). The firewall modules 108(1)-108(N) are representative of a variety of functionality operable to manage and control attempts by applications to access a network from respective clients 102(1)-102(N). Applications attempting access to a network may be configured in variety of ways such as stand-alone executable modules, add-ins, extensibility modules, plug-in modules configured to modify other executable code, or other code configured to attempt network access. Firewall modules 108(1)-108(N) may incorporate functionality to monitor port activity and protocols of respective clients 102(1)-102(N), block or halt attempts by applications to access a network, make a determination on whether or not access should be provided to a particular application, filter access to the network based on a white list, a block/allow list (e.g., a firewall policy), gathering data related to attempts at network access, communicate with service 104, and so forth. In an implementation the firewall modules 108(1)-108(N) may be provided as part of a comprehensive, integrated, and automatic computer health service further discussion of which may be found in relation to FIG. 2.

In an implementation, clients 102(1)-102(N) are configured to provide a variety of data to the client care service 104, which may then be utilized for purposes of the comprehensive health service, such as for reputation driven firewall techniques described herein, Clients 102(1)-102(N) are depicted as having respective client data 110(d), 110(e) (where "d" and "e" can be any integer from one to "D" and "E", respectively) in respective storage 112(1)-112(N). Client data 110(d), 110 (e) may include data corresponding to clients 102(1)-102(N) to be utilized in forming policies and reputations for a plurality of applications, such as data regarding applications executed on the clients 102(1)-102(N), attempts to access the network 106 or internet, and so forth. In particular, firewall modules 108(1)-108(N) operate to collect respective client data 110(d), 110(e) (referred to herein collectively as client data 110) regarding application attempts to access the network 106 from the associated client.

Client data 110 utilized in forming firewall policies may be configured in a variety of ways. For example, the client data 110 may indicate a plurality of application ids, accessed ports, firewall settings, and so on, further discussion of which may be found in relation to FIG. 2. The collected client data 110 is communicated by the clients 102(1)-102(N) to the client care service 104. For instance, the client data 110 may be uploaded at periodic intervals over the network 106 to the client care service 104.

The client care service 104, as illustrated in FIG. 1, includes a firewall manager module 114 that is representative of functionality to process the communicated (e.g., received) client data 110 to form one or more firewall policies 116(j). For instance, the firewall manager module 114, when executed, may process client data 110 provided by a plurality of clients 102(1)-102(N) to form firewall polices 116(j) describing whether particular applications should be allowed network access. The policies 116(j) may then be provided to the clients 102(1)-102(N) and applied by client firewall modules 108(1)-108(N) to control attempts to access the network. A plurality of policies 116(j) is illustrated as stored in data storage 118 of the client care service 104. Firewall manager module 114 is further representative of functionality to communicate with clients 102(1)-102N) via network 106, to collect and store the client data 110, to utilize client data to generate policies 116(j), to manage the policies 116(j) and access to policies 116(j), to provide the policies 116(j) to the clients 102(1)-102(N), and so on.

In an implementation, the policies 116(j) are based in whole or in part upon one or more reputations 120(k). The clients 102(1)-102(N) and client care service 104 are illustrated as communicatively coupled over a network 106 to a community reputation service 122 which provides the reputations 120(k). While community reputations service 122 is depicted in FIG. 1 as a stand alone service, it is noted that the functionality may be incorporated within another service such as within the client care service 104.

The community reputation service 122 is illustrated in FIG. 1 as having in storage 124 a plurality of reputations 120(k) (where k may be any number from one to "K"). Reputations 120(k) may each correspond to one or more application and by may be used by firewall modules 108(1)-108(N) to determine whether to permit attempted access by respective applications. For instance, each of reputations 120(k) may be based upon feedback (e.g. ratings, recommendations, opinions, and so forth) provided by a community of users, and may represent an overall community reputation for an application, e.g., an indication of the trustworthiness of the application to access the internet in the eyes of the community. The community of users may include one or more of the clients 102(1)-102(N), users of the client care service, a group of sophisticated users enlisted to provide reputations 120(k), an independent or third party reputation and rating service, and so forth.

The community reputation service 122, as illustrated in FIG. 1, includes a reputations module 126 that is representative of functionality to compile feedback regarding a variety of applications from a community of users used to produce reputations 120(k). Reputations 120(k) based on the community feedback may then be provided to or accessed by the firewall manager 114 and analyzed in conjunction with and/or combined with client data 110 to form the policies 116(j). Alternatively, reputations 120(k) may be accessible directly to the clients 102(1)-102(N) via network 106. Thus, the firewall policies 116(j) applied by clients 102(1)-102(N) may reference the reputations 120(k) directly or indirectly. Whether reputations 120(k) are directly incorporated into the policies 116(j) or accessed by clients 102(1)-102(N) via network 106, the clients 102(1)-102(N) and in particular the firewall modules 108(1)-108(N) may be configured to determine a response to an network access attempt by a particular application based upon the corresponding reputation 120(k) of the particular application. Further discussion of the production and utilization applications of policies 116(j) and reputations 120(k) to control and manage network access via a client may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the reputation based firewall techniques described below are platform-independent, meaning that the techniques may be implemented on a variety of commercial computing platforms having a variety of processors.

Figure 2:
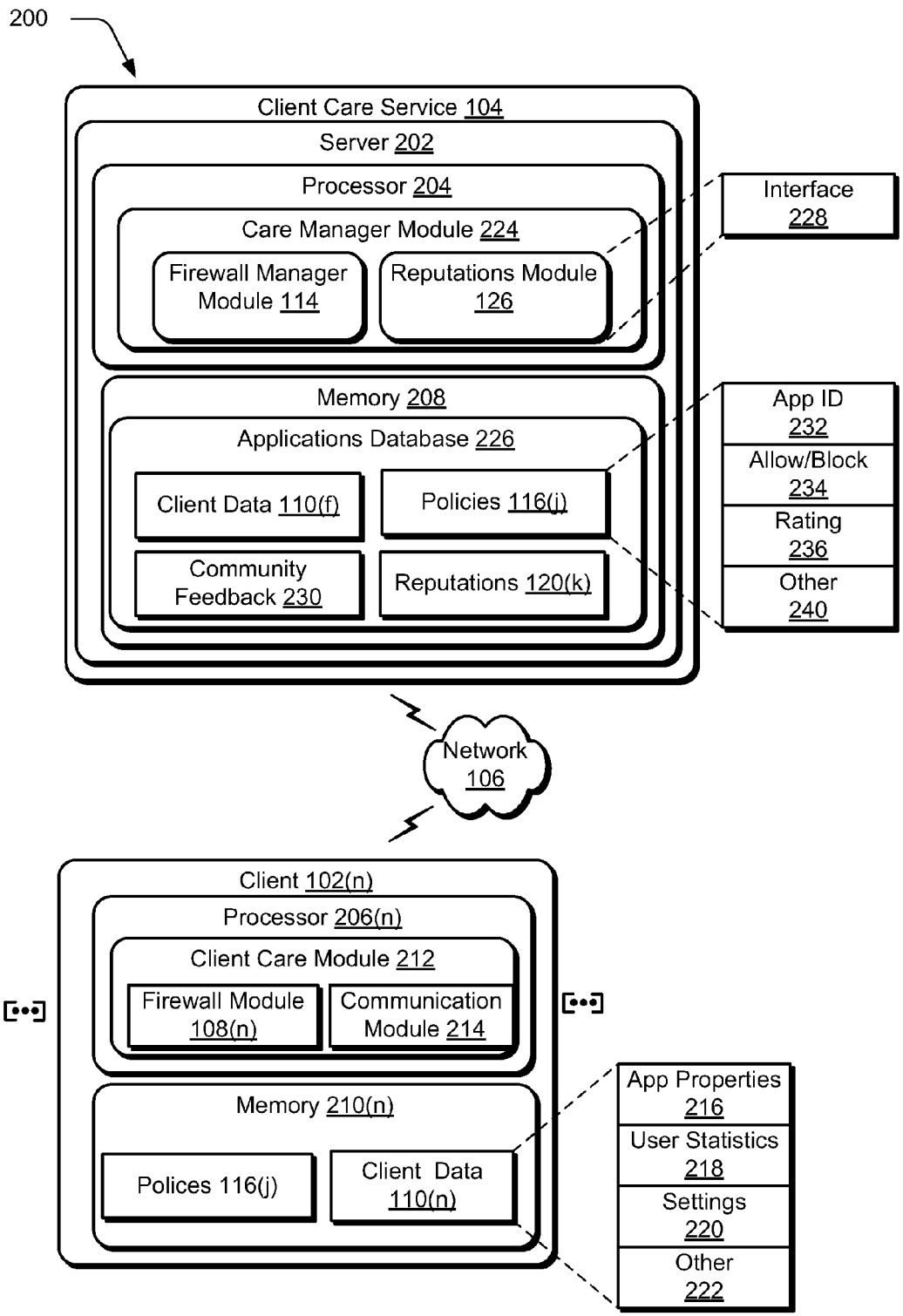
FIG. 2 is an illustration of a system in an exemplary implementation showing a client care service and clients of FIG. 1 in greater detail.

FIG. 2 is an illustration of a system 200 in an exemplary implementation showing the client care service 104 and the plurality of clients of FIG. 1 in greater detail. The client care service 104 is illustrated as being implemented by a server 202, which although a single server 202 is illustrated, server 202 may be representative of multiple servers, e.g., a server cluster. The client 102(n), which in FIG. 2 is illustrated as a client device, may be representative of any one of the clients 102(1)-102(N). As illustrated, the server 202 and the client 102(n) include respective processors 204, 206(n) and memory 208, 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210 is shown, respectively, for the server 202 and the client 102(n), a wide variety of types and combinations of memory may be employed, such as random access memory (RAM), hard disk memory, removable medium memory, and other types of computer-readable media.

The firewall module 108(n) is illustrated in FIG. 2 as implemented as part of a client care module 212 executed on the processor 206(n), which is also storable in memory 210(n). The client care module 212 is representative of an integrated health care service which may provide a comprehensive suite of services related to the health and performance of respective clients, e.g. computing device. For instance, the client care modules 212 may integrate a wide range of client care functionality examples of which include antivirus, antispyware, and firewall to help protect clients 102(n) from viruses, worms, trojan horses, hackers, and other threats. Further examples of client care functionality which may be integrated via client care module 212 include automatic backup and restore, automated tune-up for increased performance, defragmentation, software and security updates and so on.

Client care module 212 is further illustrated as including a communication module 214. Communication module 214 represents functionality to provide communication between the client 102(n) and the client care service 104. For instance, communication module 212 may operate to communicate client data 110(n) to the client care service 104, to seek and get access to policies 116(j) maintained by client care service, or otherwise to communicate with the client care service 104. Further, communication module 214 may operate to download one or more of the plurality of policies 116(j) to the client 102(n), represented in FIG. 2 by policies 116(j) stored in memory 210(n). A variety of modes of communication are contemplated some examples of which are individual messages between the service 104 and client 102(n) according to Simple Object Access Protocol (SOAP) or other protocols, periodic broadcast messaging postings and polling, as well other suitable communication modes.

As previously noted, the client data 110(n) may be configured to include a wide range of information associated with a client 102(n), including information specific to operation of firewall modules 108(n) on client 102(n) and utilized to produce policies 116(j). For instance, client data 110(n) illustrated in FIG. 2 as stored in memory 210(n) of client 102(n) may include data corresponding to attempts by a plurality of applications to access the internet, network 106, or other networks. More specifically, client data 110(n) may be collected by the firewall module 108(n) for each attempt and may describe applications properties 216 which may include applications identifiers, binaries, or signatures of applications, attributes and behaviors of the applications such as size, location of the files or data, registry access, size of attempted data transfer, protocols used, ports usage, and so on; user statistics 218 describing how users have responded to applications and attempts by application to access a network, the times and number of attempts, overrides (blocking) of applications allowed by default, and various client settings 220 (e.g., client configurations for devices, hardware/software, drivers, internet settings and so on). A variety of other 222 client data is contemplated which may be utilized to produce policies 116(j) as well as for other integrated health functionality provide by client care module 212. Other 222 client data may include for example the type of client device, user profiles, installed software profiles or lists, data input by a user such as to describe an application or problem, and so on.

Client care service 104 includes a care manager module 224 depicted as executed on processor 204 and which is also storable in memory 208. The care manager module 224 may operate in conjunction with the client care modules 212 of clients 102(n) to provide the range of functionality offered via an integrated health care service. The firewall manager module 114 in FIG. 2 is implemented as a sub-module of the care manager module 224. Further, the functionality of reputation service 122 of FIG. 1 is depicted as integrated with the client care service 104 via reputations module 126 which is implemented as a sub-module of the care manager module 224.

Memory 208 of server 202 is illustrated as including an applications database 226. The application database 226 may be configured in a variety of ways to maintain data related to a plurality of applications and in particular data for reputation driven firewall techniques described herein. For instance, the application database 226 may be a relational database such as one based on structured query language (SQL) or other suitable database protocols and/or languages. The application database 226 is illustrated as including client data 110(f) which represents client data 110(n) which has been uploaded to the service 104 via network 106 by a plurality of clients 102(n). Application database 226 is further depicted as including a plurality of reputations 120(k) which may be produced via the reputations module 126 and/or an external reputation service such as reputation service 122 depicted in FIG. 1.

In an implementation, the reputations module 126 is configured to expose an interface 228 through which client care service 104 compiles a plurality of community feedback data 230 corresponding to a variety of applications. Community feedback data 230 compiled via the interface 228 is illustrated as storable within application database 226 in memory 208 on the server 202. Naturally, community feedback data 230 may also be stored in a separate database, on a different server of the client care service 104, in remote storage, or other suitable storage.

An interface 228 is illustrated as exposed by reputations module 126 executed on processor 204. Interface 228 may provide a community of users public or non-public access to the applications database 226 through which the users may examine data regarding a plurality of applications (e.g. client data, 110(f)) maintained in the applications database 226. Users may then input feedback 230 regarding the applications in a variety of forms such as opinions, and/or recommendations via the interface 228. The community of users may include one or more of clients 102(n), users of the client care service 104, a group of sophisticated users enlisted to provide reputations 120(k), an independent or third party reputation and rating service, and so forth.

Reputation module 126 may obtain the inputted feedback 230 and process the data to produce reputations 120(k) each of which corresponds to one or more applications. The reputations 120(k) may then be stored in the database 226 or other suitable storage and referenced by the client care service 104, by the firewall manager module 114, by policies 116(j), by a client 102(n) and so forth. For instance, reputations 120(k) may be referenced to determine whether attempts to access a network by an application should be permitted or denied.

In an implementation, the reputations 120(k) may be configured as ratings such as on a relative scale from 1 to 10, via a textual rating such as "safe", "moderate" or "high risk", and so forth. Interface 228 for example may be configured to seek feedback 230 in the form of ratings for a plurality of applications by providing functionality for the users to search among the plurality of applications (e.g., search the database 226), review associated data 110(f), and to rate one or more applications, such as by selecting a relative rating from ratings options provided via the interface. For instance, the interface 228, when a user searches the database for a particular application, may expose a summary or report of data collected for the application, a prompt for a rating such as a selectable portion indicating "Click to Rate this Application?", and a portion for inputting the rating and/or comments, such as via an input box, a list of selectable ratings, text entry control, checkboxes and the like. A variety of arrangements of interface 228 to provide functionality for a community of users to review, update, utilize or otherwise interact with database 228 are contemplated.

The reputations 120(k) produced for the plurality of applications may be configured to indicate the ratings provided by one or more individual users, and/or to provide an overall rating or summarizations (e.g. a mean, average and so forth) based upon community feedback 230 from a plurality of users. For instance, reputation module 126 may perform statistical analysis of feedback data 230 received for an application to produce the overall rating for the application. Further, the reputations 120(k) may also include user comments input via the interface 228, such as textual comments corresponding particular applications. For instance, a user may recommend uninstalling the application, upgrading to a new version, an alternative product and the like.

In an implementation, reputation module 126 may be further configured to summarize the feedback data 230 according to one or more groups of users. For instance, groups or categories may be organized for different types of client use (business users, home users, gaming), different types of devices (desktop, game appliance, server, handheld), different associations (reputation service, ad-hoc community of users, a friends list), different markets (geographic regions, countries, by user demographics) and so forth. Thus, an overall rating or reputation 120(k) for an application may be different for different groups or categories of users. Clients 102(n) may identify with or be associated with various groups and accordingly may seek access to and utilize ratings or reputations 120(k) for the respective groups for determining whether to permit attempts to access a network by applications. Naturally, while reputations 120(k) are depicted as included within application database 226, the reputations 120(k) may alternatively be maintained in a separate location such as another database on server 202, or at a separate service such as reputation service 122 of FIG. 1, or other suitable storage.

As noted previously, the firewall manager module 114 may process client data 110(f) and/or reputations 120(k) to produce a plurality of policies 116(j) which are also shown as included with the application database 226. Each policy 116(j) may correspond to one or more application and may provide instructions configured to be applied by the firewall modules 108(n) to respond to respective applications. Policies 116(j) may specify one or more application identifiers 232 (e.g. name, signatures, process id, etc.) and corresponding data such as an allow/block 234 instruction, a rating 236 for the application (e.g., rated 1 to 10 or other relative rating such as "trusted", "unknown", "malicious"), as well as a variety of other instructions 240 for responding to attempts by application, such as instructions for gathering more information about the application, uninstalling or quarantining the application, links to additional data such as reputations 120(k) from client care service 104 or an external source, and so on.

For example, policies 116(j) may specify applications which are known and trusted (e.g. an allow/block 234 list or white list) and accordingly these policies 116(j) may be provided to the clients 102(n) and applied by client firewall modules 108(n) to permit attempts to access the network by the specified applications. In other instances the policies 116(j) may specify relative ratings 236, which represent the level of trust for the applications. A client 102(n) may set a threshold for the rating 236 or a trust level via the firewall module 108(n) which must be met by an application before access to the network 106 is allowed.

It is noted the policies 116(j) may be based in whole or in part upon the community feedback data 230 and/or corresponding reputations 120(k). In particular, the allow/block 234 instructions and/or ratings 236 for one or more applications may correspond to the reputations 120(k) produced from the community feedback 230. For instance, firewall manager module 114 may process the reputations 120(k) to arrive at the allow/block 234 setting or ratings 236 placed in a policy 116(j) corresponding to a plurality of applications In an implementation, the reputations 120(k) may be incorporated in or referenced by the policies 116(j), such that clients 102(n) using the policy may access the reputations to determine whether to permit access to corresponding applications. Further discussion of utilizing reputation driven firewall techniques to determine whether to permit attempts by applications to access a network may be found in relation to the following procedures.

Exemplary Procedures

The following discussion describes reputation driven firewall techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
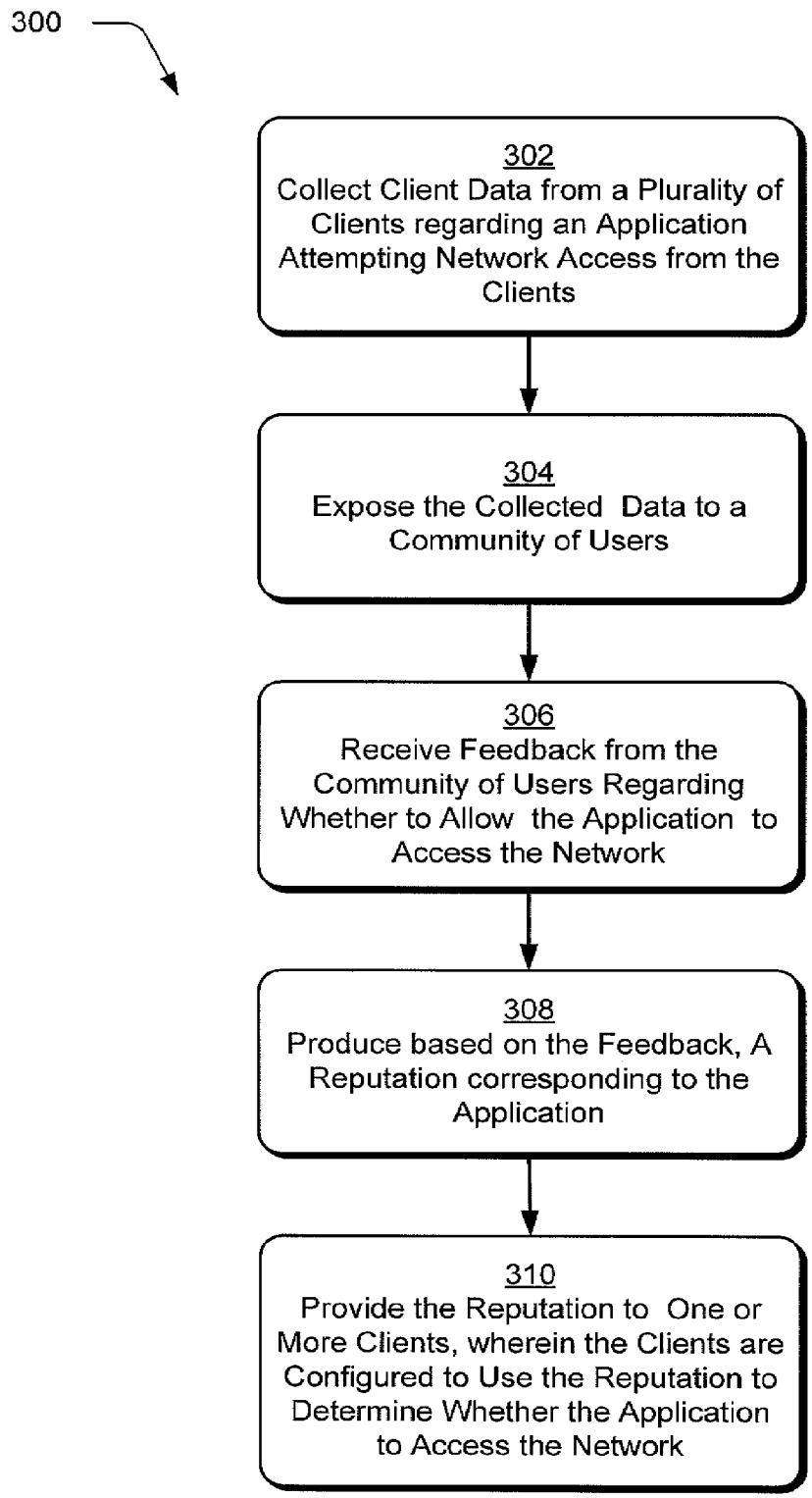
FIG. 3 is a flow diagram depicting a procedure in an exemplary implementation in which a service utilizes feedback regarding an application obtained from a community of users to produce a reputation corresponding to the application.

FIG. 3 depicts a procedure 300 in an exemplary implementation in which a service utilizes feedback regarding an application obtained from a community of users to produce a reputation corresponding to the application. Data is collected from a plurality of clients regarding an application attempting to access a network from the clients (block 302). Client care service 104 for instance may be configured to collect data from a plurality of clients 102(1)-102(N) regarding applications attempting network access on the clients. For example, an application "mail.exe" may execute on each of a plurality of clients 102(1)-102(N) and may attempt to access a network such as network 106 from the clients. The clients 102(1)-102(N), and in particular firewall modules 108(1)-108(N) may be configured to generate client data 110 corresponding to the attempt. Client data 110 corresponding to mail.exe for instance may include details of the attempt such as, identifiers of "mail.exe" (e.g., a name, process id, a hash), whether the attempt was permitted, ports and protocols used by mail.exe, settings of the client, whether a policy was applied or overridden, and so forth. Clients 102(1)-102(N) may then communicate the client data 110 to the client care service 104 via network 106 which operates to collect the data from the plurality of clients. Firewall manager module 114 for instance may be configured to collect the client data 110 corresponding to "mail.exe". In an implementation, the client data 110 corresponding to a plurality of applications may be collected and maintained by the client care service 104 in a database, such as application database 226 of FIG. 2.

The collected data is exposed to a community of users (block 304). For instance, access may be given to a community of user to the applications database 226 of FIG. 2 which may include a plurality of collected data 110(f) corresponding to a plurality of applications. In particular, reputations module 126 may expose a user interface 228 through which a community of users may interact with the database 226.

The community of users may be configured as various groups of users who provide feedback 230 on applications based on their own experiences and the exposed data 110. The community feedback 230 which drives the reputation of applications and accordingly determines the reputations 120(k) associated with the applications. In an implementation, the interface 228 may be provided via a public web site. Thus, the community of users may be public users who access the exposed data via the internet. Naturally, the community of users may also be a private group of users, such as a group of registered users of the client care service 104, a select group of consumers or sophisticated users enlisted by the service to review the collected data and provide feedback 230 on applications. Thus, the community of users may need to "sign-on" or authenticate to access the exposed client data 110. In another implementation, the user interface 228 is provided via a reputation service 122. Thus, the community of users may be a group of users of the reputation service 122.

Interface 228 may include a variety of forms, controls, web pages and the like through which the community of user may interact with the database 226 in a variety of ways. For instance, the interactions of users with the database 226 may include searching the database for information on a particular application such as "mail.exe" of the previous example, examining the data collected for applications which may include examining the raw data and/or data in summarized form such as a displayed query or report, a search report or other summarized presentation of the raw data produced by the client care service 104 and/or reputation module 126. Further, each user in the community of users may provide community feedback 230 data (such as ratings, comments, opinions and so on) on one or more of the applications via the exposed which drives the reputation of the applications.

In particular, the feedback 230 indicates whether applications should be permitted access to the network, and may be in a variety of forms such as an allow/block indication, a relative rating and/or an indication of trust as previously described. Thus, for mail.exe the from the preceding example, a plurality of users in the community of user may provide feedback 230 via an interface 228 indicating whether mail.exe should be allowed or blocked or providing a relative rating of mail.exe, as well as providing other feedback such as comments.

The feedback regarding whether the application should be permitted access is received from the community of users (block 306). For example, the reputation module 126 of FIG. 2 may receive the community feedback 230 entered by the community of users via the interface 228. A plurality of community feedback 230 is represented in FIG. 2 as being stored at the client care service 104 within the applications database 226.

Then based on the feedback, a reputation corresponding to the application is produced (block 308). The community feedback 230 may be utilized to produce reputations 120(k). FIG. 2 for example depicts the application data base 226 as including a plurality of reputation 120(k) which may each correspond to one or more application. The reputations 120(k) may each correspond to the community feedback 230 provided by an individual user, or may be a compilation of feedback 230 from a plurality of the users, or even a compilation of all of the feedback 230 provided by the community of users for particular application.

Continuing with the example of "mail.exe", one or more corresponding reputation 120(k) may be produced based on the community feedback 230 gathered regarding mail.exe. A reputation 120(k) may correspond to individual comments or ratings of mail.exe from one or more users of the community. Additionally, or alternatively a reputation 120(k) may describe an overall reputation or rating generated from the community feed back 230, such as a specifying allow or block, a percentage (86% allowed), a numeric rating, (8.6 on scale of 1 to 10), a relative term indicating trust or risk ("Good", "OK", "Malicious"), and so on. In particular, the client care service 104 or reputation module 126 may perform analysis of the feedback 230 to arrive at an overall rating for particular applications. In addition, a plurality of reputations 120(k) corresponding to "mail.exe" may be produced for different groups of users and with a different corresponding ratings. For instance, "mail.exe" may be rated "allow" or "9" for home users and "poor" or "4.5" for business users based on the community feedback 230. A variety of other groups of users and associated reputations are contemplated Then, the reputation is provided to one or more clients, wherein the clients are configured to use the reputation to determine whether to permit access to the application (block 310). For instance, a reputation 120(k) corresponding to "mail.exe" may be stored in the applications database 226 as depicted in FIG. 2 Client 102(n) and more particularly the communication module 214 of client 102(n) may be executed on processor 206(n) to access the reputation 120(k) when "mail.exe" attempts access to the internet. In an implementation the reputation 120(k) is accessed directly from the database 226 via network 106. Alternatively, a reputation 120(k) may be accessed from a reputation service 122. As previously described the functionality to expose client data 110, to obtain feedback 230, and to produce reputation 120(k) may be provided by a stand alone reputation service, such as service 122 depicted in FIG. 1. The reputation service 122 may then make the reputations 122 accessible to the clients 102(1)-102(N), client care service 104 and so on via network 106.

The reputation 120(k) corresponding to "mail.exe" may also be incorporated in or referenced by a firewall policy such as firewall policy 116(j) depicted in memory 210(n) of client 102(n). Thus, reputation 120(k) may be provided via a firewall policy 116(j) which a client 102(n) may store locally on the client, and which may be updated periodically or on demand.

The client 102(n) may access the reputation 120(k) corresponding to "mail.exe" and use the reputation 120(k) to determine whether to permit mail.exe to access the network. Alternatively the client may take other actions such as uninstalling or upgrading the application "mail.exe" based on the reputation 120(k) For instance, if reputation is configured to indicate allow or block for "mail.exe", the client 102(n) may follow the indication. If the policy is configured as a relative rating, such as a number 7.6, then the client 102(n) may determine if a threshold rating has been met. For the purposes of this example assume that the firewall module as been preconfigured with a threshold of 8.0 which it the rating that must be met by an application before access will be permitted. In this instance "mail.exe" having an associated rating of 7.6 may be denied access based on comparison of the rating to the threshold. The threshold may be set in a variety of ways such as a default threshold set by the firewall module 108(n) or service 104, an administrative setting on the client 102(n), by individual users, and so forth.

It is noted that the determination of whether to permit access may occur on the client in response to an attempt by an application such as "mail.exe" automatically and without user intervention. For instance, the firewall module 108(n) does not prompt the user whether they would like to allow or block the application (e.g., "mail.exe"). Rather, the reputation 120(k) is accessed and applied to the attempted access with "no questions asked" of the user. A user may in initially setting up firewall module 108(n) may select an option to always follow (e.g., take recommended actions) policies 116(j), reputations 120(k) and/or set a threshold rating whereupon the firewall module 108(n) operates automatically and without user intervention. Alternatively, the firewall module may be configured by default such that the reputations 120(k) and policies 116(j) are always followed.

Figure 4:
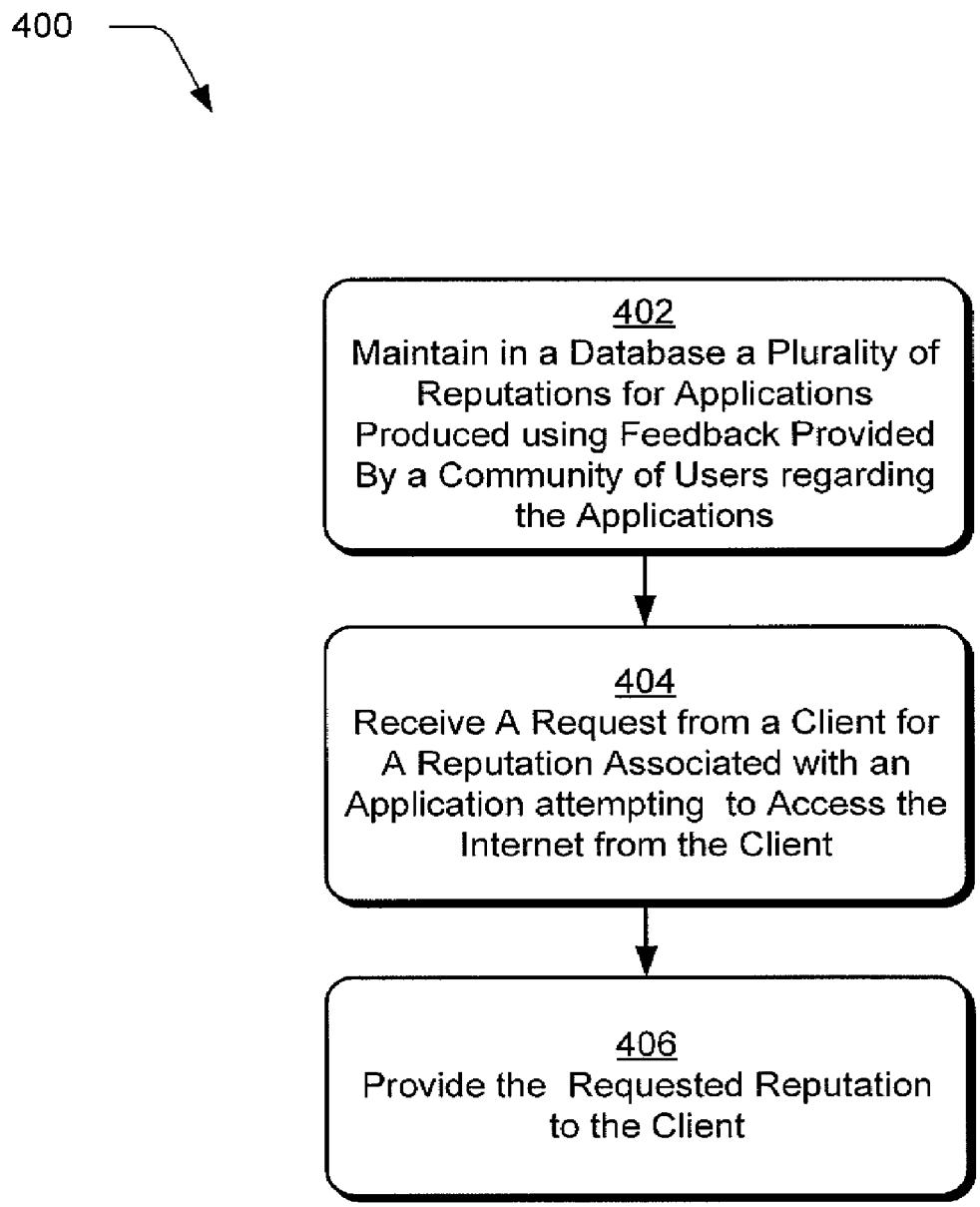
FIG. 4 is a flow diagram depicting a procedure in an exemplary implementation in which a reputation described by data maintained in a database is provided to a client upon request of the client.

FIG. 4 depicts a procedure 400 in an exemplary implementation in which a reputation described by data maintained in a database is provided to a client upon request of the client. A database is maintained having a plurality of reputations for applications produced using feedback from a community of users regarding the applications (block 402). For instance, the application database 226 of FIG. 2 may store a plurality of reputations 120(k) in memory 208 at the client care service 104. The reputations 120(k) may be produced based on feedback data 230 which is collected by the service 104, for instance via the interface 228 previously described. In particular, a community of users may access client data 110(f) also maintained in the database 226 exposed via the interface 228 and may examine the data.

The community of users may then provide feedback 230 (ratings, opinions, comments and the like) for one or more applications indicated in the client data 110(f). The feedback 230 is subsequently utilized to produce a plurality of reputations 120(k) each of which may correspond to one or more applications and which may be utilized by a firewall module 108(n) to determine whether to permit an attempt by corresponding applications to access a network on a client.

A request is received from a client for a reputation associated with an application attempting to access the internet from the client (block 404). For instance, a client 102(n) may seek a reputation 120(k) corresponding to a newly installed music player application "music.exe" executed on the client 102(n) and attempting to access the internet. When "music.exe" attempts the access, the firewall module 108(n) of client 102(n) may initially apply a policy 116(j) which specifies allow or block for a plurality of applications. However "music.exe" in this example is a new application which is not included in the policy 116(j). Rather than simply block "music.exe" as an unknown application or prompt a user of client 102(n) to indicate whether to allow or block, reputations 120(k) are employed to supplement the policy 116(j). Client 102(n) and in particular communication module 214 may form a request for a reputation 120(k) corresponding to "music.exe" and may communicate the request via network 106 to the client care service 104 which receives the request.

In implementation, reputations 120(k) may be used by a firewall module 108(n) to determine internet access for each application attempting access on a client. Thus, a request for reputations 120(k) may be made each time a new application is encountered. The reputations 120(k) rather than a policy 116(j) may be used to determine access for a corresponding reputation and accordingly the policy 116(j) may be omitted.

Alternatively, the policy 116(j) may directly or indirectly incorporate reputations 120(k). For instance, the policy 116(j) may include overall ratings, block or allow instructions and so on for a plurality of applications which are determined based on the reputations 120(k) corresponding to the applications. Further, the policy 116(j) may include links or references to reputations 120(k) available to the client such as reputation in the applications database 226 or from one or more reputation service 122.

In an implementation, a policy 116(j) may also be configured to directly include or reference reputations 120(k) such as list matching a plurality of applications with corresponding reputations 120(k). In this case, reputations 120(k) taken directly from a policy 116(j), or referenced directly by the policy 116(j) may be applied by a firewall module 108(n) to make determinations about applications attempting access. For instance, firewall module 108(n) may reference an application from the listing and obtain the corresponding reputation 120(k). The policy 116(j) in this case in a reputation based or reputation driven policy. Thus, community based reputations or recommendation from a community of users may be incorporated within a policy and used by a firewall as the basis for determining if an attempt by an application to access a network is permitted.

The requested reputation is provided to the client (block 406). For instance, the client care service 104 and in particular firewall manager module 114 may receive the request for a reputation 120(k) corresponding to "music.exe". The firewall manager module 114 may identify a corresponding reputation 120(k) from the applications database 226, or from an alternative location such as a reputation service 122. The corresponding reputation 120(k) may then be provided to the client 102(n). The providing may include actually communicating the reputation 120(k) to the client 102(n), providing the client 102(n) access to retrieve the reputation from storage (e.g., database 226), and/or providing the client 102(n) an indication of where the reputation may be obtained, such as the address or uniform resource locator (URL) of a reputation service 122 where reputations 120(k) may be stored. Providing may also include providing a policy 116(j) which includes the reputation. As noted previously, client care service 104 and client 102(n) may be configured to communicate in a variety of ways such as according to Simple Object Access Protocol (SOAP) or other protocols, via broadcast messaging postings and polling, as well other suitable communication modes. Thus, a client 102(n) may be provided with a requested reputation 120(k) corresponding to the application "music.exe". The client 102(n) may then utilize the reputation 120(k) in determining whether to permit "music.exe" to access the Internet or other network.

Figure 5:
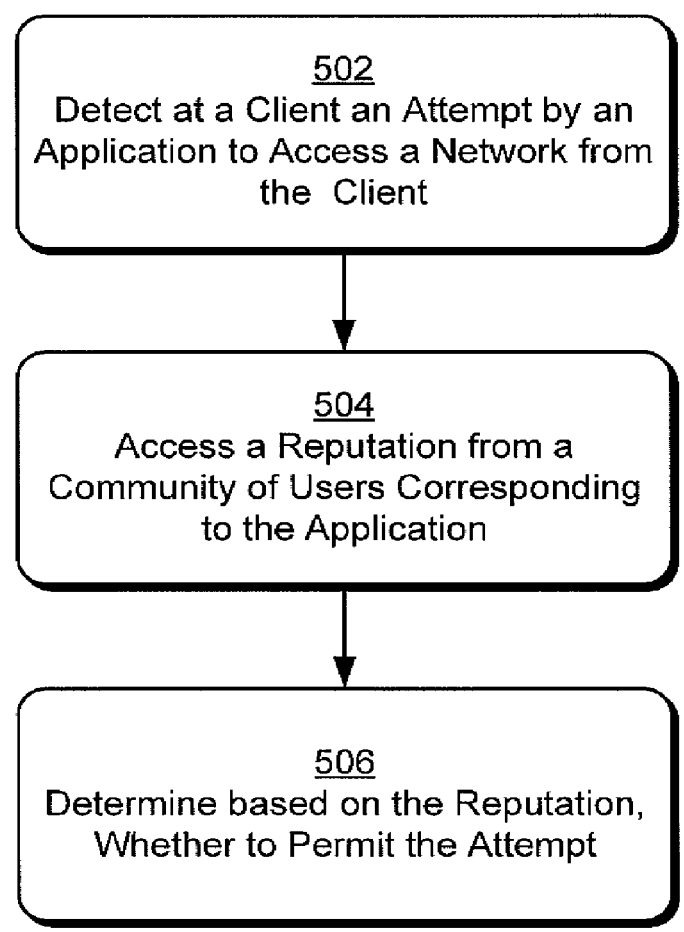
FIG. 5 is a flow diagram depicting a procedure in an exemplary implementation in which a client detects an attempt by an application to access a network and accesses a reputation of the application to determine whether to permit the attempt.

FIG. 5 depicts a procedure 500 in an exemplary implementation in which a client detects an attempt by an application to access a network and accesses a reputation of the application to determine whether to permit the attempt.

The client detects an attempt by an application to access a network from the client (block 502). For instance, a firewall module 108(1) of the client 102(1) of FIG. 1 may monitor activity such as port activity and network traffic the client 102 and may halt attempts by applications to access a network pending a determination of whether access should be permitted. Thus, firewall module 108(1) may operate as a network gatekeeper. As an example, an application module such as "spyware.exe" may be detected by the firewall module 108(1) attempting to access network 106.

The client accesses a reputation from a community of users corresponding to the application attempting the access (block 504). In order to determine whether to permit "spyware.exe" access to network 106 in the previous example, the client 102(n) may be configured to access a corresponding reputation 120(k).

Client may be configured to access the reputation 120(k) in a variety of ways. For instance, the client 102(n) may communicate with a reputation service 122 to access a reputation corresponding "spyware.exe" which may be produced based upon feedback from a community of users which is provided to the reputation service 122. Alternatively, the reputation 120(k) may be incorporated in application database 226 which is provided by a client care service 104 as previously described. Thus, client 102(1) may access the reputation 120(k) from the database 226. The access may further involve examining the reputation 120(k) from remote storage such as while the reputation 120(k) remains in the database 226, downloading the reputation 120(k) to the client 102(1), and so forth.

In an implementation, the client care service may be configured to produce one or more firewall policies 116(j) which incorporate the reputations 120(k). The policy 116(j) including a plurality of reputations corresponding to a plurality of applications may be provided by the client care service 104 to the client 102(1), such as by providing the client 102(1) access to download the policy. Thus, in this implementation, the client 102(n) may access a reputation 120(k) for "spyware.exe" which is incorporated within a firewall policy 116(j) locally on the client 102(n), such as from local storage 112(1) associated with the client.

The client then determines based on the reputation whether to permit the attempt (block 506). Reputation 120(k) may be configured in a variety of ways as previously described. In one example, the reputation 120(k) overall may be configured to indicate either "allow" or "block", and for "spyware.exe" in particular "block" may be specified. Thus, in this case client 102(1) via firewall module 108(1) will examine the reputation 120(k) and determine that access will not be permitted (e.g., block "spyware.exe").

In another example, the firewall module 108(n) may determine if the reputation 120(k) meets a specified threshold value. For instance, the reputation 120(k) may be in the form of a rating on a relative scale such as a scale of relative trustworthiness of the application which from low to high trust might include "Malicious", "Questionable", "OK", and "Trusted". The firewall module 108(n) may be configured such that only applications that meet a specified threshold value on the scale are permitted access. In this example assume that the threshold value is set at "OK". If "spyware.exe" is rated "OK" or "Trusted" via reputation 120(k), then client 102(1) based on comparison of the rating to the threshold will determine to permit the attempt. On the other hand, if the rating is "Malicious, or "Questionable" access will not be permit.

It is noted that the determination by the client 102(1) may occur automatically and with out user intervention. Thus, a user of client 102(1) may not prompted whether to block or allow spyware.exe or even whether to obtain the reputations 120(k) for various application. The firewall 108(n) module may be configured to automatically access and use the reputations 120(k) to determine whether to permit attempts to access the network. Thus, reputation driven firewall techniques may be utilized to make an automatic determination of whether to permit an attempt by an application, based on a corresponding reputation 120(k) of the application.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A non-transitory computer readable storage medium having stored thereon, computer executable instructions that, when executed by a processing device, performs a method comprising:
   maintaining, on a client device, a plurality of reputations for applications installed on the client device, wherein the plurality of reputations for the applications, are maintained by periodically accessing a central database containing reputations for applications, and wherein the central database containing reputations comprises: feedback provided by a community of users regarding the applications;
   receiving a request from one or more of the applications to access the Internet; and
   parsing the reputations to determine whether to permit the one or more applications to access the Internet, the determination comprising searching the reputations to find data that corresponds to the one or more applications requesting access to the Internet and parsing the data that corresponds to the one or more applications to determine a level of trust rating for the one or more applications, wherein the level of trust rating comprises:
   a relative textual rating of the application,
   a textual comment corresponding to the application, and
   a category specifying type of use.

2. A non-transitory computer readable storage medium as recited in claim 1, wherein the client is further configured to access the database to determine whether to permit the application to access the Internet automatically and without user intervention.

3. A non-transitory computer readable storage medium as recited in claim 1, wherein the plurality of reputations are distributed to clients incorporated with a firewall policy which matches the plurality of reputations to corresponding applications, such that when an application attempts access the clients are configured to access a corresponding reputation from the firewall policy and use the reputation to determine whether to permit the application access to the Internet automatically and without user intervention.

4. A non-transitory computer readable storage medium as recited in claim 1, wherein the reputations are configured as ratings on a relative scale which indicate trustworthiness of the applications to access the Internet.

5. A non-transitory computer readable storage medium as recited in claim 1, wherein:
   the reputations are configured as level of trust ratings on a relative scale which indicate trustworthiness of corresponding applications to access the Internet; and
   an attempt by an application is permitted when the rating corresponding to the application meets a threshold rating set by the client.

6. A method comprising:
   maintaining, on a client device, a plurality of reputations for applications installed on the client device, wherein the plurality of reputations for the applications, are maintained by periodically accessing a central database containing reputations for applications, and wherein the central database containing reputations comprises: feedback provided by a community of users regarding the applications;
   receiving a request from one or more of the applications to access the Internet; and
   parsing the reputations to determine whether to permit the one or more applications to access the Internet, the determination comprising searching the reputations to find data that corresponds to the one or more applications requesting access to the Internet and parsing the data that corresponds to the one or more applications to determine a level of trust rating for the one or more applications, wherein the level of trust rating comprises:
   a relative textual rating of the application,
   a textual comment corresponding to the application, and
   a category specifying type of use.

7. A method as recited in claim 6, wherein the client is further configured to access the database to determine whether to permit the application to access the Internet automatically and without user intervention.

8. A method as recited in claim 6, wherein the plurality of reputations are distributed to clients incorporated with a firewall policy which matches the plurality of reputations to corresponding applications, such that when an application attempts access the clients are configured to access a corresponding reputation from the firewall policy and use the reputation to determine whether to permit the application access to the Internet automatically and without user intervention.

9. A method as recited in claim 6, wherein the reputations are configured as ratings on a relative scale which indicate trustworthiness of the applications to access the Internet.

10. A method as recited in claim 6, wherein:
    the reputations are configured as level of trust ratings on a relative scale which indicate trustworthiness of corresponding applications to access the Internet; and
    an attempt by an application is permitted when the rating corresponding to the application meets a threshold rating set by the client.

* * * * *